US011589331B2

(12) United States Patent
Lin et al.

(10) Patent No.: US 11,589,331 B2
(45) Date of Patent: *Feb. 21, 2023

(54) INTERFACE ESTABLISHING METHOD AND APPARATUS

(71) Applicant: Huawei Technologies Co., Ltd., Shenzhen (CN)

(72) Inventors: Bo Lin, Beijing (CN); Philippe Reininger, Issy les Moulineaux (FR)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/935,734

(22) Filed: Jul. 22, 2020

(65) Prior Publication Data

US 2020/0351820 A1 Nov. 5, 2020

Related U.S. Application Data

(63) Continuation of application No. 15/493,628, filed on Apr. 21, 2017, now Pat. No. 10,728,876, which is a
(Continued)

(51) Int. Cl.
*H04W 72/04* (2009.01)
*H04W 68/00* (2009.01)
(Continued)

(52) U.S. Cl.
CPC ....... *H04W 68/005* (2013.01); *H04W 72/042* (2013.01); *H04W 72/0413* (2013.01);
(Continued)

(58) Field of Classification Search
None
See application file for complete search history.

(56) References Cited

U.S. PATENT DOCUMENTS

2006/0018280 A1 1/2006 Kumar et al.
2010/0330995 A1 12/2010 Aoyama et al.
(Continued)

FOREIGN PATENT DOCUMENTS

CN 1801759 A 7/2006
CN 101010926 A 8/2007
(Continued)

OTHER PUBLICATIONS

3GPP TS 36.331 V12.3.0 (Sep. 2014), Technical Specification, 3rd Generation Partnership Project; Technical Specification Group Radio Access Network; Evolved Universal Terrestrial Radio Access (E-UTRA); Radio Resource Control (RRC); Protocol specification (Release 12), 378 pages.
(Continued)

*Primary Examiner* — Eunsook Choi
(74) *Attorney, Agent, or Firm* — Slater Matsil, LLP

(57) ABSTRACT

A method includes sending, by a serving node, instruction information to an anchor node, where the instruction information is used to instruct to establish a first interface between the serving node and the anchor node; and receiving, by the serving node, response information from the anchor node in response to the first instruction information, wherein the radio resource control message carried in a signaling radio bearer 1 (SRB1) of the terminal is served by the anchor node, and the radio resource control message carried in a signaling radio bearer 0 (SRB0) of the terminal is served by the serving node.

20 Claims, 10 Drawing Sheets

Related U.S. Application Data continuation of application No. PCT/CN2014/089310, filed on Oct. 23, 2014.

(51) Int. Cl.
| | | |
|---|---|---|
| *H04W 92/20* | (2009.01) | |
| *H04W 76/10* | (2018.01) | |
| *H04W 88/12* | (2009.01) | |
| *H04W 88/08* | (2009.01) | |

(52) U.S. Cl.
CPC .......... *H04W 76/10* (2018.02); *H04W 92/20* (2013.01); *H04W 88/08* (2013.01); *H04W 88/12* (2013.01)

(56) References Cited

U.S. PATENT DOCUMENTS

| | | | |
|---|---|---|---|
| 2011/0058542 | A1 | 3/2011 | Nylander et al. |
| 2012/0039246 | A1* | 2/2012 | Zhang .................. H04W 68/02 370/315 |
| 2012/0093081 | A1 | 4/2012 | Hapsari et al. |
| 2013/0032987 | A1 | 2/2013 | Rayavarapu et al. |
| 2014/0016614 | A1* | 1/2014 | Velev .................. H04W 76/38 370/331 |
| 2014/0080484 | A1 | 3/2014 | Centonza et al. |
| 2014/0198734 | A1* | 7/2014 | Yamada ................ H04W 8/205 370/329 |
| 2014/0314050 | A1 | 10/2014 | Shindo |
| 2015/0045088 | A1 | 2/2015 | Chen |
| 2015/0049747 | A1 | 2/2015 | Yang |
| 2015/0098449 | A1 | 4/2015 | Lee et al. |
| 2015/0358832 | A1 | 12/2015 | Morioka et al. |

FOREIGN PATENT DOCUMENTS

| | | |
|---|---|---|
| CN | 102469439 A | 5/2012 |
| CN | 103313233 A | 9/2013 |
| EP | 2357872 A1 | 8/2011 |
| EP | 2426960 A1 | 3/2012 |
| EP | 2683183 A1 | 1/2014 |
| EP | 2983398 A1 | 2/2016 |
| JP | 2012525737 A | 10/2012 |
| JP | 2014135595 A | 7/2014 |
| KR | 20100116588 A | 11/2010 |
| RU | 2507715 C2 | 2/2014 |
| WO | 2010005180 A2 | 1/2010 |
| WO | 2010067686 A1 | 6/2010 |
| WO | 2013088616 A1 | 6/2013 |
| WO | 2013170209 A1 | 11/2013 |
| WO | 2014031989 A1 | 2/2014 |
| WO | 2014109603 A1 | 7/2014 |
| WO | 2014163082 A1 | 10/2014 |
| WO | 2014168549 A1 | 10/2014 |

OTHER PUBLICATIONS

3rd Generation Partnership Project; Technical Specification Group Radio Access Network; Evolved Universal Terrestrial Radio Access Network (E-UTRAN); X2 application protocol (X2AP) (Release 12); 3GPP TS 36.423 V12.3.0 Technical Specification; Sep. 2014; 153 pages.

Alcatel-Lucent; "Exchange of configuration information and parameter negotiation on X2"; 3GPP TSG-RAN WG3 Meeting #65bis; R3-092437; Oct. 12-15, 2009; Miyazaki, Japan; 18 pages.

CATT; "Analysis on RRC Message Ambiguity for C-plane Architectures", 3GPP TSG RAN WG2 Meeting #82; R2-131917; May 20-24, 2013; Fukuoka, Japan; 4 pages.

Ericsson (Rapporteur); "Summary of email discussion [81 bis#18][LTE/SCE-HL] CP protocol and architecture alternatives"; 3GPP TSG-RAN WG2 #82; R2-131673; May 20-24, 2013; Fukuoka, Japan; 36 pages.

NTT Docomo, Inc.; "Necessity of C-plane architecture enhancements for dual connectivity"; 3GPP TSG-RAN2# 81bis; R2-131329; Apr. 15-19, 2013; Chicago, USA; 4 pages.

NTT Docomo, Inc. (Rapporteur); "RAN2 status on Small Cell Enhancements"; 3GPP TSG-RAN WG3 #80; R3-131123; May 20-24, 2013; Fukuoka, Japan; 8 pages.

Samsung, "Discussion on signaling load reduction," 3GPP TSG-RAN WG2 Meeting #83bis; R2-133264; Oct. 7-11, 2013; Ljubljana, Slovenia; 6 pages.

ZTE Corporation, "Discussion on Single Path Anchored Connectivity", 3GPP TSG-RAN2 #83, Barcelona, Spain, Aug. 19-23, 2013,7 pages, R2-132382.

ZTE, "X2 Setup between eNB and HeNB," R3-131011, 3GPP TSG-RAN3 Meeting #80, Fukuoka, Japan, May 20-24, 2013, 6 pages.

ETRI, "Discussion on RRC signalling via SeNB", 3GPP TSG-RAN2 Meeting #84, R2-134005, San Francisco, CA, US, Oct. 11-15, 2013, 3 pages.

Interdigital Communications, "L2 Transport of Control Plane Signaling with Dual Connectivity", 3GPP TSG-RAN WG2 #83, R2-132717, Barcelona, Spain, Aug. 19-23, 2013, 7 pages.

LG Electronics Inc., "Discussion on control plane aspects for SCE", 3GPP TSG-RAN WG3 Meeting #81bis, R3-131827, Venice, Italy, Oct. 7-11, 2013, 3 pages.

* cited by examiner

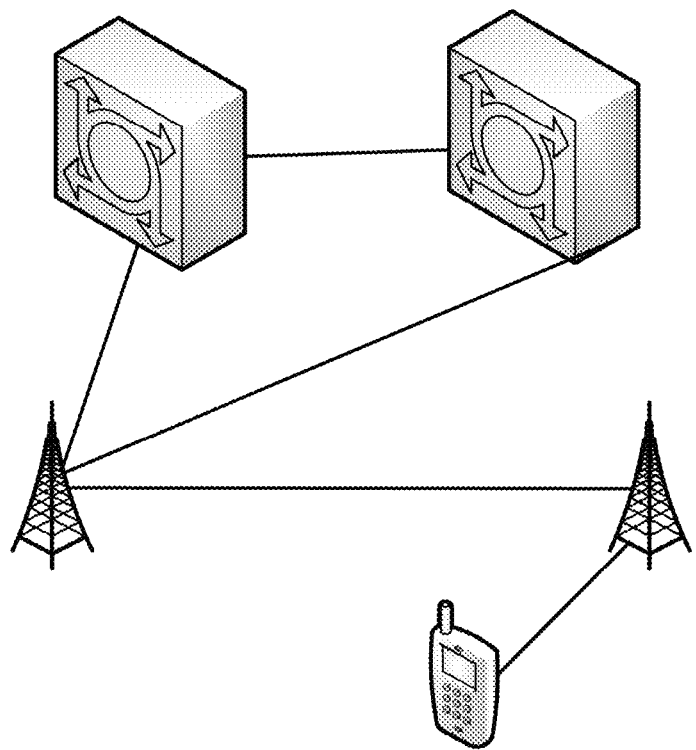

FIG. 1

```
┌─────────────────────────────────────────────────────────────┐
│ A serving node sends first instruction information to an    │  ── S201
│ anchor node, where the first instruction information is     │
│ used to instruct to establish a first interface between     │
│ the serving node and the anchor node                        │
└─────────────────────────────────────────────────────────────┘
                              │
                              ▼
┌─────────────────────────────────────────────────────────────┐
│ The serving node receives response information sent by the  │  ── S202
│ anchor node in response to the first instruction            │
│ information                                                 │
└─────────────────────────────────────────────────────────────┘
```

FIG. 2

INTERFACE ESTABLISHING METHOD AND APPARATUS

CROSS-REFERENCE TO RELATED APPLICATIONS

This application is a continuation of U.S. patent application Ser. No. 15/493,628, filed on Apr. 21, 2017, which is a continuation of International Patent Application No. PCT/CN2014/089310, filed on Oct. 23, 2014. All of the aforementioned patent applications are hereby incorporated by reference in their entireties.

TECHNICAL FIELD

The present invention relates to the field of communications, and in particular, to an interface establishing method and apparatus.

BACKGROUND

With increase of user terminals (User Equipment), an existing radio communications system cannot meet radio communication requirements of a user. Therefore, it is urgent to increase a system capacity of the radio communications system. The system capacity can be increased by adding a base station. A typical practice is to densely deploy many small cells in a macro cell to form more pico cells. However, most UEs are connected to only one base station, and this base station provides a radio communications service for the UE. For ease of description, the base station that provides the radio communications service for the UE is referred to as a serving node of the UE.

In the prior art, when the UE moves from one cell to another cell or when the UE moves from a coverage area of one base station to a coverage area of another base station or when the UE discovers a radio link failure (RLF), the UE may switch the serving node. That is, the serving node of the UE changes from one base station to another base station. Because the serving node is connected to a mobility management entity (MME) through a control plane interface, and the serving node is connected to an serving gateway (SGW) through a user plane interface, after the serving node of the UE is changed, signaling needs to be sent between a new serving node and the MME to update an S1 control plane connection between the serving node and the MME; at the same time, signaling also needs to be sent between the MME and the SGW to update an S1 user plane connection between the serving node and the SGW. In this way, each handover process brings at least four messages. When density of deployed base stations increases, handover increases sharply, and causes signaling load of a core network to increase sharply. In addition, each serving node is connected to the MME through a control plane interface. When the MME needs to send a paging message, the MME sends the paging message to all base stations in a tracking area (TA) corresponding to the paging message, and this causes the signaling load of the core network to increase sharply.

SUMMARY

In view of this, embodiments of the present invention provide an interface establishing method and apparatus, to reduce signaling load of a core network.

According to a first aspect, an embodiment of the present invention provides an interface establishing method, where the method includes: sending, by a serving node, first instruction information to an anchor node, and receiving, by the serving node, response information sent by the anchor node in response to the first instruction information, where the first instruction information is used to instruct to establish a first interface between the serving node and the anchor node; or receiving, by a serving node, first instruction information sent by an anchor node, and sending, by the serving node, response information to the anchor node in response to the first instruction information, where the first instruction information is used to instruct to establish a first interface; where the first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the serving node and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

In a first possible implementation manner of the first aspect, the method further includes: receiving, by the serving node, an uplink RRC message sent by the user terminal, where the uplink RRC message includes: the RRC message carried in the SRB0, the RRC message carried in the SRB1, or the RRC message carried in the SRB2; processing, by the serving node, the SRB0 in the uplink RRC message, or sending, through the first interface, the RRC message carried in the SRB1 or the RRC message carried in the SRB2 in the uplink RRC message to the anchor node for processing; and/or generating, by the serving node, a downlink RRC message carried in the SRB0, and sending the downlink RRC message to the user terminal through the air interface connection, or receiving, by the serving node through the first interface, a downlink RRC message carried in the SRB1 or the SRB2 and sent by the anchor node, and sending, by the serving node, the downlink RRC message carried in the SRB1 or the SRB2 to the user terminal through the air interface connection.

With reference to the first aspect or the first possible implementation manner of the first aspect, in a second possible implementation manner, before the sending, by a serving node, first instruction information to an anchor node, the method further includes: obtaining, by the serving node, anchor node information of an anchor node associated with the serving node.

With reference to the first aspect or the first or second possible implementation manner of the first aspect, in a third possible implementation manner, the interface for establishing the interface connection between the anchor node and the MME is specifically an S1-MME interface.

With reference to the first aspect or the first or second or third possible implementation manner of the first aspect, in a fourth possible implementation manner, the obtaining, by the serving node, anchor node information of an anchor node associated with the serving node specifically includes: obtaining, by the serving node, the anchor node information by means of an operation administration maintenance OAM system; or obtaining, by the serving node, the anchor node information by means of a downlink signal of the anchor node, where the downlink signal includes a synchronization signal and system information; or when the anchor node information is configured on the serving node, obtaining the configured anchor node information of the anchor node associated with the serving node.

With reference to the first aspect or the first or second or third or fourth possible implementation manner of the first aspect, in a fifth possible implementation manner, the method further includes: receiving, by the serving node, a first tracking area code TAC that is sent by the anchor node and that needs to be supported by the serving node, or indicating, by the serving node, a second TAC supported by the serving node to the anchor node; and receiving, by the serving node, a paging message sent by the anchor node through the first interface, where the paging message is received by the anchor node from the MME through the interface established between the anchor node and the mobility management entity, and the first TAC or the second TAC is included in the paging message sent by the MME.

With reference to the first aspect or the first or second or third or fourth or fifth possible implementation manner of the first aspect, in a sixth possible implementation manner, the anchor node is a base station, or the anchor node is a centralized controller or a control plane server.

With reference to the first aspect or the first or second or third or fourth or fifth or sixth possible implementation manner of the first aspect, in a seventh possible implementation manner, the method further includes: sending, by the serving node, a code of a serving cell of the serving node to the anchor node, where the code of the serving cell is used by the anchor node to use the serving cell as a serving cell of the anchor node, and is sent to a neighboring anchor node or a neighboring base station of the anchor node.

With reference to the first aspect or the first or second or third or fourth or fifth or sixth or seventh possible implementation manner of the first aspect, in an eighth possible implementation manner, the method further includes: receiving, by the serving node through the control plane interface between the serving node and the anchor node, a non-UE associated Non-UE Associated message sent by the anchor node, where the Non-UE Associated message is received by the anchor node from the MME.

According to a second aspect, an embodiment of the present invention provides an interface establishing method. The method includes: receiving, by an anchor node, a first instruction message sent by a serving node, and sending, by the anchor node, response information to the anchor node in response to the first instruction message, where the first instruction information is used to instruct to establish a first interface between the serving node and the anchor node; or sending, by the anchor node, first instruction information to the serving node, and receiving, by the anchor node, response information sent by the serving node in response to the first instruction information, where the first instruction information is used to instruct to establish a first interface; where the first interface includes at least a control plane interface between the serving node and the anchor node, the control plane interface is at least used to: transmit an RRC message of a user terminal, establish an interface connection between the anchor node and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

In a first possible implementation manner of the second aspect, the method further includes: receiving, by the anchor node through the first interface, the RRC message carried in the SRB1 or the RRC message carried in the SRB2 in an uplink RRC message sent by the serving node, and processing the RRC message, where the uplink RRC message is received by the serving node from the user terminal, and the uplink RRC message includes: the RRC message carried in the SRB0, the RRC message carried in the SRB1, or the RRC message carried in the SRB2; and/or sending, by the anchor node, a downlink RRC message carried in the SRB1 or the SRB2 to the serving node through the first interface, so that the serving node sends the downlink RRC message carried in the SRB1 or the SRB2 to the user terminal through the air interface connection, where the downlink RRC message includes: the RRC message carried in the SRB1 or the RRC message carried in the SRB2.

With reference to the second aspect or the first possible implementation manner of the second aspect, in a second possible implementation manner, before the receiving, by an anchor node, a first instruction message sent by a serving node, the method further includes: obtaining, by the anchor node, serving node information of a serving node associated with the anchor node.

With reference to the second aspect or the first or second possible implementation manner of the second aspect, in a third possible implementation manner, the interface for establishing the interface connection between the anchor node and the MME is specifically an S1-MME interface.

With reference to the second aspect or the first or second or third possible implementation manner of the second aspect, in a fourth possible implementation manner, the obtaining, by the anchor node, serving node information of a serving node associated with the anchor node specifically includes: obtaining, by the anchor node, the serving node information by means of an OAM; or when the serving node information is configured on the anchor node, obtaining the configured serving node information of the serving node associated with the anchor node.

With reference to the second aspect or the first or second or third or fourth possible implementation manner of the second aspect, in a fifth possible implementation manner, the method further includes: sending, by the anchor node, a first TAC that needs to be supported by the serving node to the serving node, or receiving, by the anchor node, a second TAC supported by the serving node and indicated by the serving node; and receiving, by the anchor node through the interface established between the anchor node and the MME, a paging message sent by the MME; and when the first TAC or the second TAC is included in the paging message, sending, by the anchor node, the paging message to the serving node through the first interface.

With reference to the second aspect or the first or second or third or fourth or fifth possible implementation manner of the second aspect, in a sixth possible implementation manner, the anchor node is a base station, or the anchor node is a centralized controller or a control plane server.

With reference to the second aspect or the first or second or third or fourth or fifth or sixth possible implementation manner of the second aspect, in a seventh possible implementation manner, the method further includes: receiving a code of a serving cell of the serving node that is sent by the serving node, where the code of the serving cell is used by the anchor node to use the serving cell as a serving cell, and is sent to a neighboring anchor node or a neighboring base station.

With reference to the second aspect or the first or second or third or fourth or fifth or sixth or seventh possible implementation manner of the second aspect, in an eighth possible implementation manner, the method further includes: receiving, by the anchor node, a Non-UE Associated message sent by the MME, and sending, by the anchor node, the Non-UE Associated message to the serving node through the control plane interface between the serving node and the anchor node.

According to a third aspect, an embodiment of the present invention provides an interface establishing apparatus. The apparatus includes: a sending unit, configured to send first instruction information to an anchor node, where the first instruction information is used to instruct to establish a first interface between a serving node and the anchor node; and a receiving unit, configured to receive response information sent by the anchor node in response to the first instruction information; or the receiving unit, further configured to receive first instruction information sent by an anchor node, where the first instruction information is used to instruct to establish a first interface; and the sending unit, further configured to send response information to the anchor node in response to the first instruction information; where the first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the apparatus and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

In a first possible implementation manner of the third aspect, the apparatus further includes a processing unit, the receiving unit is further configured to receive an uplink RRC message sent by the user terminal, where the uplink RRC message includes: the RRC message carried in the SRB0, the RRC message carried in the SRB1, or the RRC message carried in the SRB2; the processing unit is configured to process the SRB0 in the uplink RRC message, or the sending unit is further configured to send, through the first interface, the RRC message carried in the SRB1 or the RRC message carried in the SRB2 in the uplink RRC message to the anchor node for processing; and/or the sending unit is further configured to generate a downlink RRC message carried in the SRB0, and send the downlink RRC message to the user terminal through the air interface connection, or receive, through the first interface, a downlink RRC message carried in the SRB1 or the SRB2 and sent by the anchor node, and send the downlink RRC message carried in the SRB1 or the SRB2 to the user terminal through the air interface connection.

With reference to the third aspect or the first possible implementation manner of the third aspect, in a second possible implementation manner, the apparatus further includes: an obtaining unit, configured to obtain anchor node information of an anchor node associated with the serving node.

With reference to the third aspect or the first or second possible implementation manner of the third aspect, in a third possible implementation manner, the interface for establishing the interface connection between the anchor node and the MME is specifically an S1-MME interface.

With reference to the third aspect or the first or second or third possible implementation manner of the third aspect, in a fourth possible implementation manner, the obtaining unit is specifically configured to: obtain the anchor node information by means of an operation administration maintenance OAM system; or obtain the anchor node information by means of a downlink signal of the anchor node, where the downlink signal includes a synchronization signal and system information; or when the anchor node information is configured on the apparatus, obtain the configured anchor node information of the anchor node associated with the serving node.

With reference to the third aspect or the first or second or third or fourth possible implementation manner of the third aspect, in a fifth possible implementation manner, the receiving unit is further configured to receive a first tracking area code TAC that is sent by the anchor node and that needs to be supported, or the sending unit is further configured to indicate a second TAC supported by the serving node to the anchor node; and the receiving unit is further configured to receive a paging message sent by the anchor node through the first interface, where the paging message is received by the anchor node from the MME through the interface established between the anchor node and the mobility management entity, and the first TAC or the second TAC is included in the paging message sent by the MME.

With reference to the third aspect or the first or second or third or fourth or fifth possible implementation manner of the third aspect, in a sixth possible implementation manner, the anchor node is a base station, or the anchor node is a centralized controller or a control plane server.

With reference to the first aspect or the first or second or third or fourth or fifth or sixth possible implementation manner of the first aspect, in a seventh possible implementation manner, the sending unit is further configured to send a code of a serving cell of the serving node to the anchor node, where the code of the serving cell is used by the anchor node to use the serving cell as a serving cell of the anchor node, and is sent to a neighboring anchor node or a neighboring base station of the anchor node.

With reference to the third aspect or the first or second or third or fourth or fifth or sixth or seventh possible implementation manner of the third aspect, in an eighth possible implementation manner, the receiving unit is further configured to receive, through the control plane interface between the serving node and the anchor node, a non-UE associated Non-UE Associated message sent by the anchor node, where the Non-UE Associated message is received by the anchor node from the MME.

With reference to the third aspect or the first or second or third or fourth or fifth or sixth or seventh or eighth possible implementation manner of the third aspect, in a ninth possible implementation manner, the apparatus is located in the serving node.

According to a fourth aspect, an embodiment of the present invention provides an interface establishing apparatus. The apparatus includes: a receiving unit, configured to receive a first instruction message sent by a serving node, where the first instruction information is used to instruct to establish a first interface between the serving node and an anchor node; and a sending unit, configured to send response information to the apparatus in response to the first instruction message; or the sending unit, further configured to send first instruction information to the serving node, where the first instruction information is used to instruct to establish a first interface; and the receiving unit, further configured to receive response information sent by the serving node in response to the first instruction information; where the first interface includes at least a control plane interface between the serving node and the anchor node, the control plane interface is at least used to: transmit an RRC message of a user terminal, establish an interface connection between the apparatus and an MME, and establish an air interface connection between the serving node and the user terminal, the RRC message carried in an SRB1 or an SRB2 in RRC message of the user terminal is served by the anchor node, and the RRC message carried in an SRB0 of the user terminal is served by the serving node.

In a first possible implementation manner of the first aspect, the receiving unit is further configured to receive, through the first interface, the RRC message carried in the SRB1 or the RRC message carried in the SRB2 in an uplink RRC message sent by the serving node, and process the RRC message, where the uplink RRC message is received by the serving node from the user terminal, and the uplink RRC message includes: the RRC message carried in the SRB0, the RRC message carried in the SRB1, or the RRC message carried in the SRB2; and/or the sending unit is further configured to send a downlink RRC message carried in the SRB1 or the SRB2 to the serving node through the first interface, so that the serving node sends the downlink RRC message carried in the SRB1 or the SRB2 to the user terminal through the air interface connection, where the downlink RRC message includes: the RRC message carried in the SRB1 or the RRC message carried in the SRB2.

With reference to the first aspect or the first possible implementation manner of the first aspect, in a second possible implementation manner, the apparatus further includes: an obtaining unit, configured to obtain serving node information of a serving node associated with the anchor node.

With reference to the first aspect or the first or second possible implementation manner of the first aspect, in a third possible implementation manner, the interface for establishing the interface connection between the apparatus and the MME is specifically an S1-MME interface.

With reference to the first aspect or the first or second or third possible implementation manner of the first aspect, in a fourth possible implementation manner, the obtaining unit is specifically configured to: obtain the serving node information by means of an OAM; or when the serving node information is configured on the apparatus, obtain the configured serving node information of the serving node associated with the anchor node.

With reference to the first aspect or the first or second or third or fourth possible implementation manner of the first aspect, in a fifth possible implementation manner, the sending unit is further configured to send a first TAC that needs to be supported by the serving node to the serving node, or the receiving unit is further configured to receive a second TAC supported by the serving node and indicated by the serving node; the receiving unit is further configured to receive, through the interface established between the apparatus and the MME, a paging message sent by the MME; and the sending unit is further configured to: when the first TAC or the second TAC is included in the paging message, send the paging message to the serving node through the first interface.

With reference to the first aspect or the first or second or third or fourth or fifth possible implementation manner of the first aspect, in a sixth possible implementation manner, the apparatus is a base station, or is a centralized controller or a control plane server.

With reference to the first aspect or the first or second or third or fourth or fifth or sixth possible implementation manner of the first aspect, in a seventh possible implementation manner, the receiving unit is further configured to receive a code of a serving cell of the serving node that is sent by the serving node, where the code of the serving cell is used by the anchor node to use the serving cell as a serving cell, and is sent to a neighboring anchor node or a neighboring base station.

With reference to the first aspect or the first or second or third or fourth or fifth or sixth or seventh possible implementation manner of the first aspect, in an eighth possible implementation manner, the receiving unit is further configured to receive a Non-UE Associated message sent by the MME, and send the Non-UE Associated message to the serving node through the control plane interface between the serving node and the anchor node.

With reference to the first aspect or the first or second or third or fourth or fifth or sixth or seventh or eighth possible implementation manner of the first aspect, in a ninth possible implementation manner, the apparatus is located in the anchor node.

According to a fifth aspect, an embodiment of the present invention provides an interface establishing apparatus. The apparatus includes: a network interface; a processor; a memory; an application program that is physically stored in the memory, where the application program includes an instruction that may enable the processor and the system to execute an instruction of the following process: sending first instruction information to an anchor node, and receiving response information sent by the anchor node in response to the first instruction information, where the first instruction information is used to instruct to establish a first interface between the serving node and the anchor node; or receiving first instruction information sent by an anchor node, and sending response information to the anchor node in response to the first instruction information, where the first instruction information is used to instruct to establish a first interface; where the first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the apparatus and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

According to a sixth aspect, an embodiment of the present invention provides an interface establishing apparatus. The apparatus includes: a network interface; a processor; a memory; and an application program that is physically stored in the memory, where the application program includes an instruction that may enable the processor and the system to execute an instruction of the following process: receiving a first instruction message sent by a serving node, and sending response information to the apparatus in response to the first instruction message, where the first instruction information is used to instruct to establish a first interface between the serving node and the anchor node; or sending first instruction information to the serving node, and receiving response information sent by the serving node in response to the first instruction information, where the first instruction information is used to instruct to establish a first interface; where the first interface includes at least a control plane interface between the serving node and the anchor node, the control plane interface is at least used to: transmit an RRC message of a user terminal, establish an interface connection between the apparatus and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

According to the interface establishing method provided in the embodiments of the present invention, a serving node sends first instruction information to an anchor node; and the serving node receives response information sent by the anchor node in response to the first instruction information. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

BRIEF DESCRIPTION OF THE DRAWINGS

FIG. 1 is a schematic diagram of a network architecture according to an embodiment of the present invention;

FIG. 2 is a flowchart of an interface establishing method according to Embodiment 1 of the present invention;

DETAILED DESCRIPTION OF ILLUSTRATIVE EMBODIMENTS

Figure 3A:
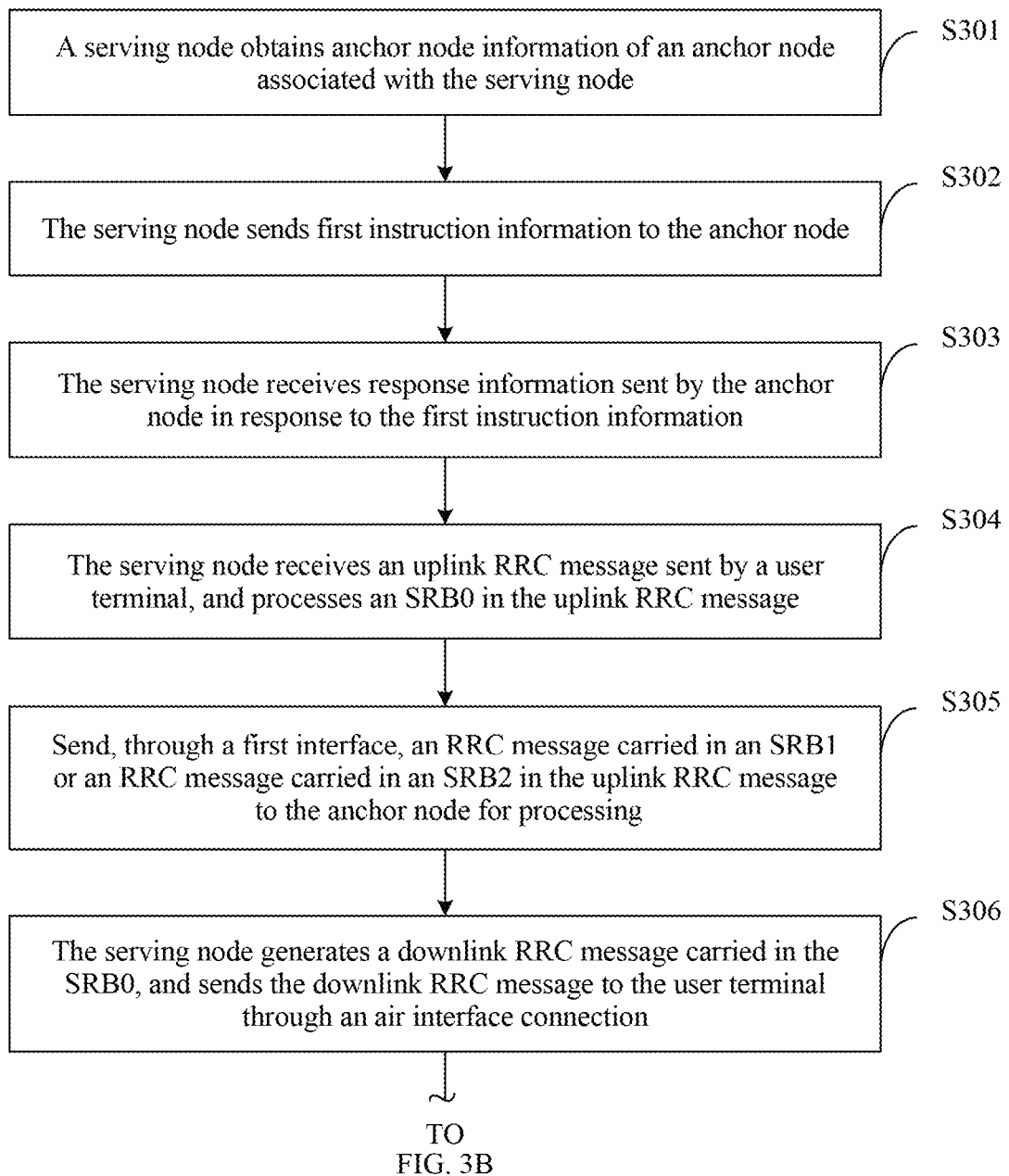
FIG. 3A and FIG. 3B are a detailed flowchart of an interface establishing method according to Embodiment 2 of the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

In the embodiments of the present invention, referring to a schematic diagram of a network architecture shown in FIG. 1, no direct connection is established between a serving node and an MME. Instead, the serving node is connected to an anchor node, and the anchor node is connected to the MME, so that the serving node is connected to the MME by means of the anchor node. In the embodiments of the present invention, an S1-C control plane interface and an S1-U user plane interface are established respectively between an MME of a core network and the anchor node, and between an SGW of the core network and the anchor node. The anchor node is connected to the serving node through a signal tunnel (backhaul) to establish an interface, and this interface may be specifically an enhanced X2 interface or may be another type of interface. A radio link connection is established between UE and the serving node. The serving node does not process RRC messages independently, but the anchor node and the serving node jointly process the RRC messages. Depending on types of the RRC messages, the anchor node processes some of the RRC messages, and the serving node processes remaining RRC messages, so that an RRC function is split onto the two nodes. An environment is created for the UE, so that an RRC connection can terminate at a first anchor.

The interface establishing method provided in the embodiments of the present invention is based on a network architecture with a split RRC function. The anchor node and the serving node jointly process the RRC messages of the UE. Because the anchor node is always connected to the MME, by establishing an interface between the serving node and the anchor node, a radio connection between the terminal and the serving node can terminate at the anchor node. When the terminal changes the serving node of the same anchor node, an interface of the terminal does not need to be changed, thereby reducing signaling load of the core network caused by handover, reducing a quantity of paging messages and Non-UE Associated messages, and further reducing the signaling load of the core network. Therefore, when the serving node of the UE switches from one base station to another base station, the MME does not need to send a paging message to all base stations managed by the MME, thereby effectively reducing signaling load in a network.

Embodiment 1

The following uses FIG. 2 as an example to elaborate on an interface establishing method provided in Embodiment 1 of the present invention. The method is based on a network architecture with a split RRC function. FIG. 2 is a flowchart of an interface establishing method according to this embodiment of the present invention. An entity for implementing Embodiment 1 of the present invention may be a serving node. As shown in FIG. 2, the method includes the following steps.

Step S201: The serving node sends first instruction information to an anchor node, where the first instruction information is used to instruct to establish a first interface between the serving node and the anchor node.

The anchor node is a base station, or the anchor node is a centralized controller or a control plane server. The first instruction information is used to instruct to establish the first interface between the serving node and the anchor node. The first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the serving node and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

The RRC message corresponding to the SRB1 or the SRB2 in the RRC message of the user terminal is served by the anchor node, and the RRC message corresponding to the SRB0 of the user terminal is served by the serving node. That is, to serve is to process an uplink RRC message or generate a downlink RRC message.

The first interface is an X2 interface or an X3 interface. The X2 interface is an interface between one base station and another, and implements interconnection between base stations eNBs. The X2 interface is divided into an X2 user plane and an X2 control plane. The user plane of the X2 interface provides user data transmission function between the eNBs.

Specifically, an S1-C control plane is established between the anchor node and the MME of a core network, and an S1-U user plane interface is established between the anchor node and a serving gateway (SGW). The serving node herein does not need to establish an interface with the core network.

An SRB1 RRC is an RRC message of the UE at a moment of connection establishment completion, and an SRB2 RRC is an RRC message of the UE after connection establishment completion.

A radio resource control (RRC) function is to split a function of processing RRC messages in the SRB0, the SRB1, and the SRB2 onto two nodes. The SRB0 is processed by the serving node, and SRB1 and SRB2 are processed by the anchor node. The two nodes are connected through an interface, preferably, an X2 interface.

Preferably, before the sending, by the serving node, first instruction information to an anchor node, the method further includes: obtaining, by the serving node, anchor node information of an anchor node associated with the serving node.

Optionally, the obtaining, by the serving node, anchor node information of an anchor node associated with the serving node specifically includes: obtaining, by the serving node, the anchor node information by means of an operation administration maintenance OAM system; or obtaining, by the serving node, the anchor node information by means of a downlink signal of the anchor node, where the downlink signal includes a synchronization signal and system information; or when the anchor node information is configured on the serving node, obtaining the configured anchor node information of the anchor node associated with the serving node.

Specifically, the anchor node information is configured on the serving node by means of a configuration server. The configuration server herein may be the operation administration and maintenance (OAM) system.

Alternatively, when the anchor node is a base station, by using a method for probing a downlink signal of a base station, the serving node probes the downlink signal of the anchor node to obtain the anchor node information. The downlink signal includes a synchronization signal and system information.

Alternatively, the anchor node information is configured on the serving node when the serving node is deployed.

Step S202: The serving node receives response information sent by the anchor node in response to the first instruction information.

After the serving node receives the response information sent by the anchor node, it indicates completion of establishing the first interface between the serving node and the anchor node.

The anchor node is a base station, or the anchor node is a centralized controller or a control plane server.

The serving node is a radio transceiver function entity with a scheduling capability, for example, an eNodeB eNB in a Long Term Evolution (LTE) system.

The anchor node information includes at least an identifier of the anchor node, preferably, an eNodeB identifier eNB ID.

The first interface X2 interface is not used for conventional communication between two base stations that are in a parallel relationship, but is used for communication between two base stations that are in a master-slave relationship. That is, a majority of SRB1s and SRB2s of the user terminal (User Equipment) terminate at the anchor node, and a minority terminate at the serving node.

In this embodiment of the present invention, steps S101 and S102 may be replaced with the following optional solutions.

Optionally, the serving node receives first instruction information sent by an anchor node, and the serving node sends response information to the anchor node in response to the first instruction information, where the first instruction information is used to instruct to establish a first interface.

Optionally, the interface for establishing the interface connection between the anchor node and the MME is specifically an S1-MME interface.

Preferably, after completion of establishing the first interface, the method further includes: receiving, by the serving node, an uplink RRC message sent by the user terminal, where the uplink RRC message includes: the RRC message carried in the SRB0, the RRC message carried in the SRB1, or the RRC message carried in the SRB2; processing, by the serving node, the SRB0 in the uplink RRC message, or sending, through the first interface, the RRC message carried in the SRB1 or the RRC message carried in the SRB2 in the uplink RRC message to the anchor node for processing; and/or generating, by the serving node, a downlink RRC message carried in the SRB0, and sending the downlink RRC message to the user terminal through the air interface connection, or receiving, by the serving node through the first interface, a downlink RRC message carried in the SRB1 or the SRB2 and sent by the anchor node, and sending, by the serving node, the downlink RRC message carried in the SRB1 or the SRB2 to the user terminal through the air interface connection.

The uplink RRC message includes: the RRC message carried in the SRB0, the RRC message carried in the SRB1, or the RRC message carried in the SRB2.

Specifically, the serving node has a function of the SRB0, and primarily processes a system broadcast message served by a BCCH, a cell paging message served by a PCCH, and optionally RRC messages served by a CCCH in a radio resource control (RRC) connection establishment process and an RRC connection re-establishment process of the UE. The serving node has an exclusive RRC protocol entity, configured to generate and send a system broadcast message, and send, to the anchor node, a system broadcast message of a serving cell to which the serving node belongs. The system broadcast message may be a MIB, a SIB, a paging message, or MBMS control information. A protocol stack of the serving node includes an RLC protocol entity corresponding to a DRB, an SRB1, and an SRB2 of the UE, and a MAC protocol entity and a physical layer (PHY) protocol entity that are corresponding to the UE.

Preferably, the serving node receives a first tracking area code TAC that is sent by the anchor node and that needs to be supported by the serving node, or the serving node indicates a second TAC supported by the serving node to the anchor node.

The serving node receives a paging message sent by the anchor node through the first interface, where the paging message is received by the anchor node from the MME through the interface established between the anchor node and the mobility management entity, and the first TAC or the second TAC is included in the paging message sent by the MME.

The TAC is a tracking area code (TAC). The response information in establishing the first interface includes the first TAC that needs to be supported by the serving node, or the first instruction message includes the second TAC that can be supported by the serving node.

Preferably, the serving node sends a code of a serving cell of the serving node to the anchor node, where the code of the serving cell is used by the anchor node to use the serving cell as a serving cell of the anchor node, and is sent to a neighboring anchor node or a neighboring base station of the anchor node.

Specifically, the anchor node uses the serving cell as a local serving cell, and forwards the system broadcast message to the neighboring anchor node or the neighboring base station of the anchor node, so as to receive a request message from the neighboring anchor node or the neighboring eNB in the future.

Preferably, the serving node receives, through the control plane interface between the serving node and the anchor node, a non-UE associated Non-UE Associated message sent by the anchor node, where the Non-UE Associated message is received by the anchor node from the MME.

Specifically, after the serving node receives the paging message and another Non-UE Associated message, the RRC protocol entity of the serving node processes the messages.

According to the interface establishing method provided in this embodiment of the present invention, a serving node sends first instruction information to an anchor node; and the serving node receives response information sent by the anchor node in response to the first instruction information. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

Embodiment 2

Figure 3B:
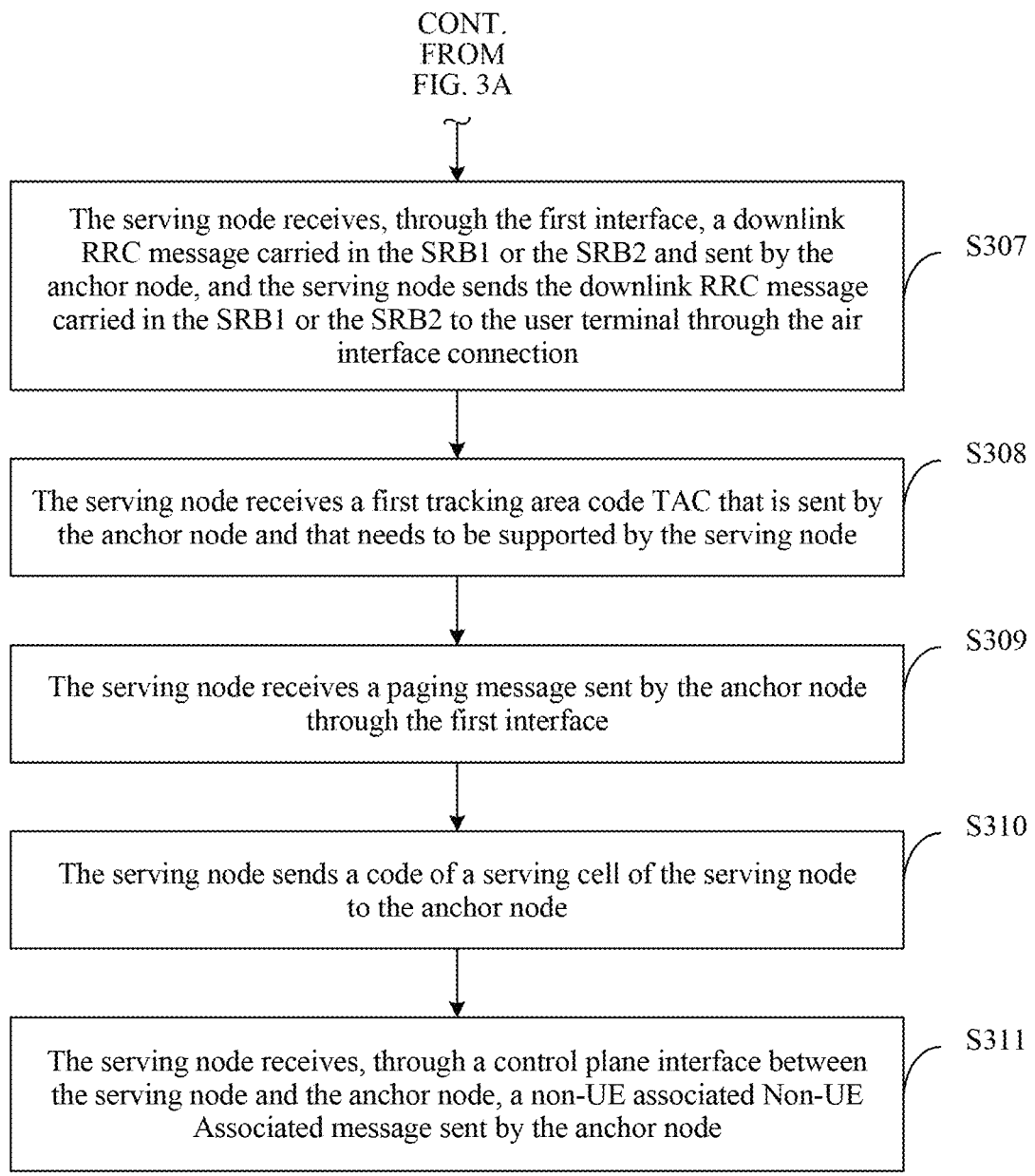

FIG. 3A and FIG. 3B are a detailed flowchart of an interface establishing method according to Embodiment 2 of the present invention. An entity for implementing Embodiment 2 of the present invention may be a serving node. As shown in FIG. 3A and FIG. 3B, the method includes the following steps.

Step S301: The serving node obtains anchor node information of an anchor node associated with the serving node.

The obtaining, by the serving node, anchor node information of an anchor node associated with the serving node specifically includes: obtaining, by the serving node, the anchor node information by means of an operation administration maintenance OAM system; or obtaining, by the serving node, the anchor node information by means of a downlink signal of the anchor node, where the downlink signal includes a synchronization signal and system information; or when the anchor node information is configured on the serving node, obtaining the configured anchor node information of the anchor node associated with the serving node.

Step S302: The serving node sends first instruction information to the anchor node.

The anchor node is a base station, or the anchor node is a centralized controller or a control plane server.

The first instruction information is used to instruct to establish a first interface between the serving node and the anchor node.

Step S303: The serving node receives response information sent by the anchor node in response to the first instruction information.

The first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the serving node and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

The interface for establishing the interface connection between the anchor node and the MME is specifically an S1-MME interface.

In this embodiment of the present invention, steps S302 and S303 may be replaced with the following optional solutions.

Optionally, the serving node receives first instruction information sent by an anchor node, and the serving node sends response information to the anchor node in response to the first instruction information, where the first instruction information is used to instruct to establish a first interface.

Step S304: The serving node receives an uplink RRC message sent by a user terminal, and processes an SRB0 in the uplink RRC message.

The uplink RRC message includes: the RRC message carried in the SRB0, the RRC message carried in the SRB1, or the RRC message carried in the SRB2.

Step S305: Send, through the first interface, an RRC message carried in an SRB1 or an RRC message carried in an SRB2 in the uplink RRC message to the anchor node for processing.

Step S306: The serving node generates a downlink RRC message carried in the SRB0, and sends the downlink RRC message to the user terminal through the air interface connection.

Step S307: The serving node receives, through the first interface, a downlink RRC message carried in the SRB1 or the SRB2 and sent by the anchor node, and the serving node sends the downlink RRC message carried in the SRB1 or the SRB2 to the user terminal through the air interface connection.

In Embodiment 2 of the present invention, there is no definite order between steps S306 and S307 and steps S304 and S305, that is, steps S306 and S307 may be performed before steps S304 and S305, or either steps S306 and S307 or steps S304 and S305 may be performed.

Step S308: The serving node receives a first tracking area code TAC that is sent by the anchor node and that needs to be supported by the serving node.

Optionally, the serving node indicates a second TAC supported by the serving node to the anchor node.

Step S309: The serving node receives a paging message sent by the anchor node through the first interface.

The paging message is received by the anchor node from the MME through the interface established between the anchor node and the mobility management entity, and the first TAC or the second TAC is included in the paging message sent by the MME.

Step S310: The serving node sends a code of a serving cell of the serving node to the anchor node.

The code of the serving cell is used by the anchor node to use the serving cell as a serving cell of the anchor node, and is sent to a neighboring anchor node or a neighboring base station of the anchor node.

Step S311: The serving node receives, through the control plane interface between the serving node and the anchor node, a non-UE associated Non-UE Associated message sent by the anchor node.

The Non-UE Associated message is received by the anchor node from the MME.

According to the interface establishing method provided in this embodiment of the present invention, a serving node sends first instruction information to an anchor node; and the serving node receives response information sent by the anchor node in response to the first instruction information. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover. When the anchor node receives a paging message sent by an MME, and a first TAC or a second TAC is included in the paging message, the serving node directly receives the paging message sent by the anchor node, thereby reducing a quantity of paging messages and further reducing the signaling load of the core network.

Embodiment 3

Figure 4:
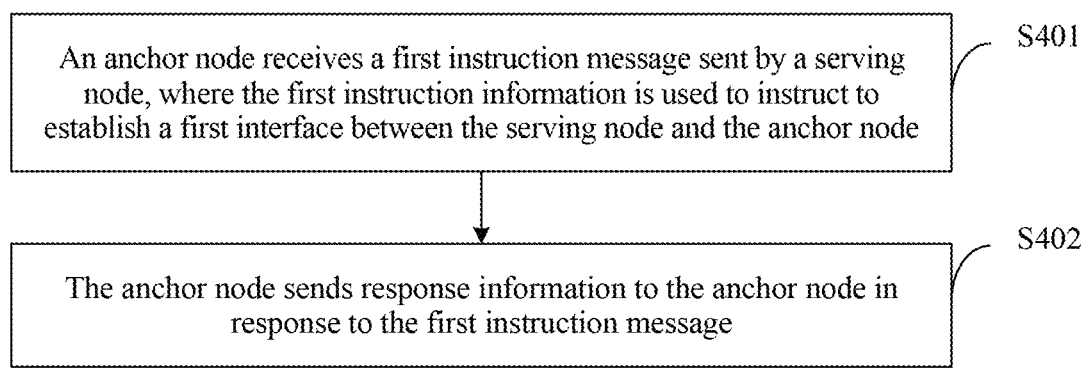
FIG. 4 is a flowchart of an interface establishing method according to Embodiment 3 of the present invention.

The following uses FIG. 4 as an example to elaborate on an interface establishing method according to Embodiment 3 of the present invention. FIG. 4 is a flowchart of an interface establishing method according to Embodiment 3 of the present invention. An entity for implementing Embodiment 3 of the present invention may be an anchor node. As shown in FIG. 4, the method includes the following steps.

Step S401: The anchor node receives a first instruction message sent by a serving node, where the first instruction information is used to instruct to establish a first interface between the serving node and the anchor node.

The first interface includes at least a control plane interface between the serving node and the anchor node, the control plane interface is at least used to: transmit an RRC message of a user terminal, establish an interface connection between the anchor node and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

The first interface is an X2 interface or an X3 interface. The X2 interface is an interface between one base station and another, and implements interconnection between base stations eNBs. The X2 interface is divided into an X2 user plane and an X2 control plane. The user plane of the X2 interface provides user data transmission function between the eNBs.

Specifically, an S1-C control plane is established between the anchor node and the MME of a core network, and an S1-U user plane interface is established between the anchor node and a serving gateway (SGW). The serving node herein does not need to establish an interface with the core network.

An SRB1 RRC is an RRC message of the UE at a moment of connection establishment completion, and an SRB2 RRC is an RRC message of the UE after connection establishment completion.

A radio resource control (RRC) function is to split a function of processing RRC messages in the SRB0, the SRB1, and the SRB2 onto two nodes. The SRB0 is processed by the serving node, and SRB1 and SRB2 are processed by the anchor node. The two nodes are connected through an interface, preferably, an X2 interface.

Preferably, before the receiving, by the anchor node, a first instruction message sent by a serving node, the method further includes: obtaining, by the anchor node, serving node information of a serving node associated with the anchor node.

Optionally, the obtaining, by the anchor node, serving node information of a serving node associated with the anchor node specifically includes: obtaining, by the anchor node, the serving node information by means of an OAM; or when the serving node information is configured on the anchor node, obtaining the configured serving node information of the serving node associated with the anchor node.

Step S402: The anchor node sends response information to the anchor node in response to the first instruction message.

The anchor node is a base station, or the anchor node is a centralized controller or a control plane server.

The serving node is a radio transceiver function entity with a scheduling capability, for example, an eNodeB eNB in a Long Term Evolution (LTE) system.

The anchor node information includes at least an identifier of the anchor node, preferably, an eNodeB identifier eNB ID.

The first interface X2 interface is not used for conventional communication between two base stations that are in a parallel relationship, but is used for communication between two base stations that are in a master-slave relationship. That is, a majority of SRB1s and SRB2s of the user terminal (User Equipment) terminate at the anchor node, and a minority terminate at the serving node.

In this embodiment of the present invention, steps S401 and S402 may be replaced with the following optional solutions.

Optionally, the anchor node sends first instruction information to the serving node, and the anchor node receives response information sent by the serving node in response to the first instruction information, where the first instruction information is used to instruct to establish a first interface.

Preferably, the anchor node receives, through the first interface, the RRC message carried in the SRB1 or the RRC message carried in the SRB2 in an uplink RRC message sent by the serving node, and processes the RRC message, where the uplink RRC message is received by the serving node from the user terminal, and the uplink RRC message includes: the RRC message carried in the SRB0, the RRC message carried in the SRB1, or the RRC message carried in the SRB2; and/or the anchor node sends a downlink RRC message carried in the SRB1 or the SRB2 to the serving node through the first interface, so that the serving node sends the downlink RRC message carried in the SRB1 or the SRB2 to the user terminal through the air interface connection, where the downlink RRC message includes: the RRC message carried in the SRB1 or the RRC message carried in the SRB2.

Specifically, the serving node has a function of the SRB0, and primarily processes a system broadcast message served by a BCCH, a cell paging message served by a PCCH, and optionally RRC messages served by a CCCH in a radio resource control (RRC) connection establishment process and an RRC connection re-establishment process of the UE. The serving node has an exclusive RRC protocol entity, configured to generate and send a system broadcast message, and send, to the anchor node, a system broadcast message of a serving cell to which the serving node belongs. The system broadcast message may be a MIB, a SIB, a paging message, or MBMS control information. A protocol stack of the serving node includes an RLC protocol entity corresponding to a DRB, an SRB1, and an SRB2 of the UE, and a MAC protocol entity and a physical layer (PHY) protocol entity that are corresponding to the UE.

Preferably, the anchor node sends a first TAC that needs to be supported by the serving node to the serving node, or the anchor node receives a second TAC supported by the serving node and indicated by the serving node; and the anchor node receives, through the interface established between the anchor node and the MME, a paging message sent by the MME.

When the first TAC or the second TAC is included in the paging message, sending, by the anchor node, the paging message to the serving node through the first interface.

The TAC is a tracking area code (TAC). The response information in establishing the first interface includes the first TAC that needs to be supported by the serving node, or the first instruction message includes the second TAC that can be supported by the serving node.

Preferably, a code of a serving cell of the serving node that is sent by the serving node is received, where the code of the serving cell is used by the anchor node to use the serving cell as a serving cell, and is sent to a neighboring anchor node or a neighboring base station.

Specifically, the anchor node uses the serving cell as a local serving cell, and forwards the system broadcast message to the neighboring anchor node or the neighboring base station of the anchor node, so as to receive a request message from the neighboring anchor node or the neighboring eNB in the future.

Preferably, the anchor node receives a Non-UE Associated message sent by the MME, and the anchor node sends the Non-UE Associated message to the serving node through the control plane interface between the serving node and the anchor node.

Specifically, after the serving node receives the paging message and another Non-UE Associated message, the RRC protocol entity of the serving node processes the messages.

According to the interface establishing method provided in this embodiment of the present invention, an anchor node receives a first instruction message sent by a serving node; and the anchor node sends response information to the anchor node in response to the first instruction message. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

Embodiment 4

Figure 5A:
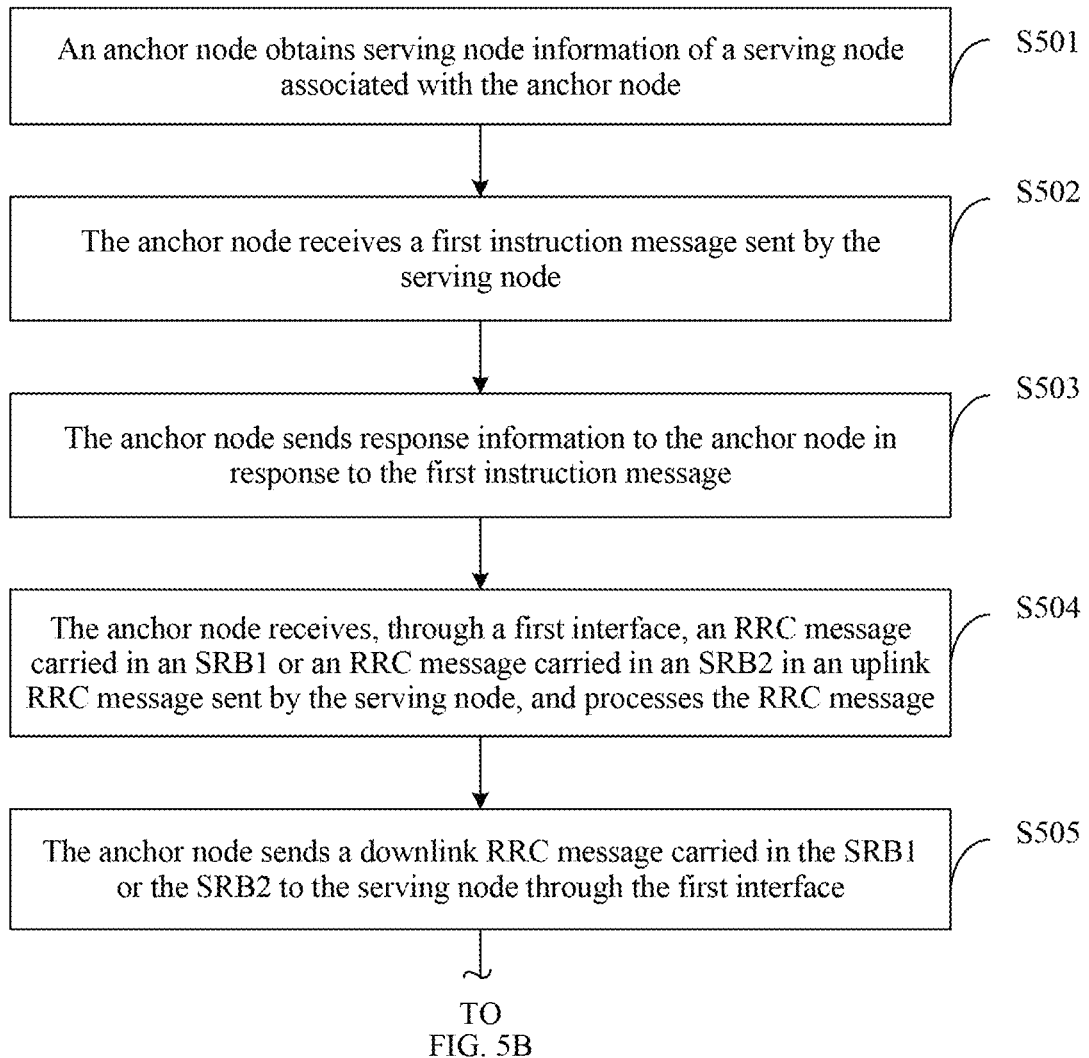
FIG. 5A and FIG. 5B are a detailed flowchart of an interface establishing method according to Embodiment 4 of the present invention.
Figure 5B:
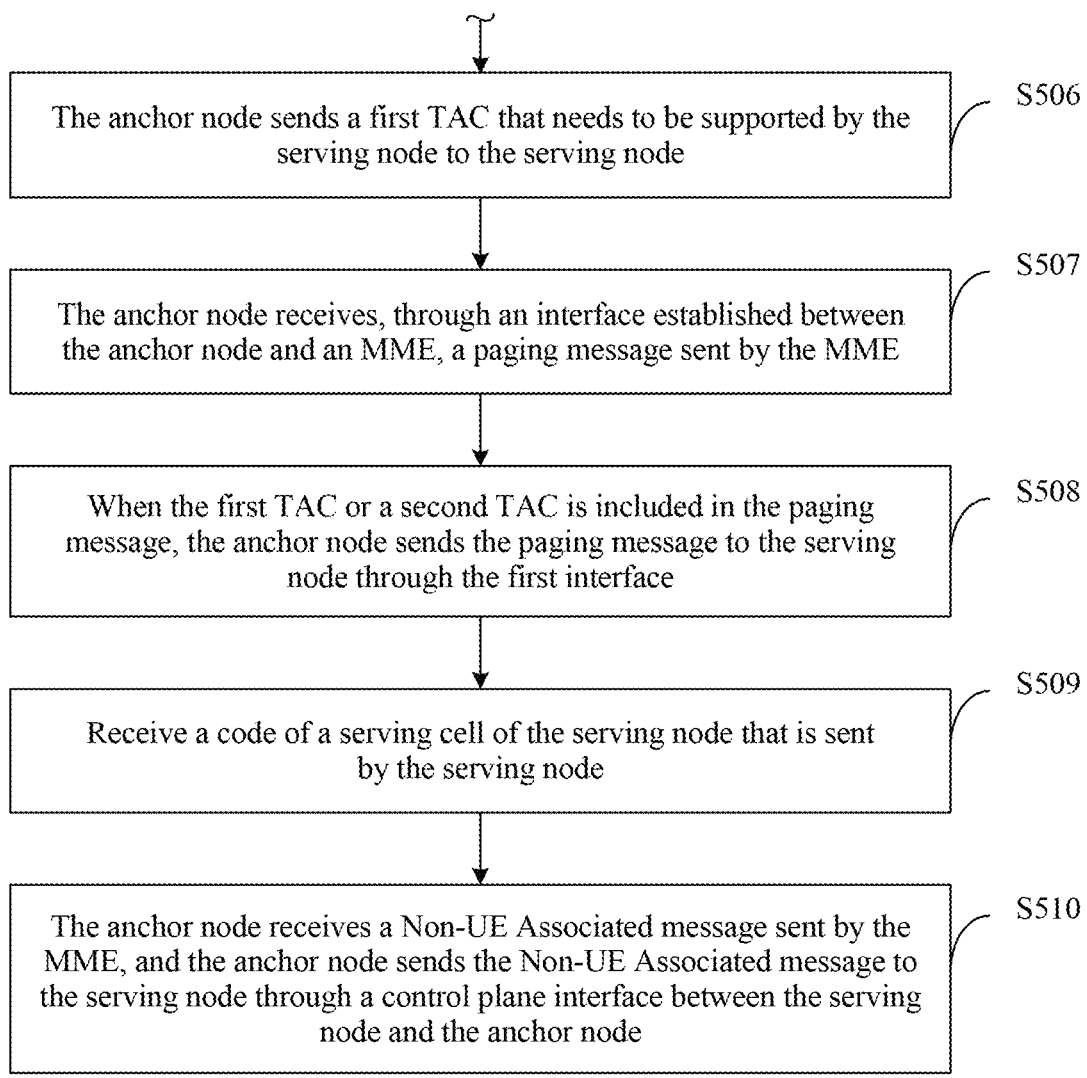

FIG. 5A and FIG. 5B are a detailed flowchart of an interface establishing method according to this embodiment of the present invention. An entity for implementing Embodiment 4 of the present invention may be an anchor node. As shown in FIG. 5A and FIG. 5B, the method includes the following steps.

Step S501: The anchor node obtains serving node information of the serving node associated with the anchor node.

That the anchor node obtains serving node information of a serving node associated with the anchor node specifically includes: obtaining, by the anchor node, the serving node information by means of an OAM; or when the serving node information is configured on the anchor node, obtaining the configured serving node information of the serving node associated with the anchor node.

Step S502: The anchor node receives a first instruction message sent by the serving node.

The anchor node is a base station, or the anchor node is a centralized controller or a control plane server.

The first instruction information is used to instruct to establish a first interface between the serving node and the anchor node.

Step S503: The anchor node sends response information to the anchor node in response to the first instruction message.

The first interface includes at least a control plane interface between the serving node and the anchor node, the control plane interface is at least used to: transmit an RRC message of a user terminal, establish an interface connection between the anchor node and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

The interface for establishing the interface connection between the anchor node and the MME is specifically an S1-MME interface.

In this embodiment of the present invention, steps S502 and S503 may be replaced with the following optional solutions.

Optionally, the anchor node sends first instruction information to the serving node, and the anchor node receives response information sent by the serving node in response to the first instruction information, where the first instruction information is used to instruct to establish a first interface.

Step S504: The anchor node receives, through the first interface, an RRC message carried in an SRB1 or an RRC message carried in an SRB2 in an uplink RRC message sent by the serving node, and processes the RRC message.

The uplink RRC message is received by the serving node from the user terminal, and the uplink RRC message includes: the RRC message carried in an SRB0, the RRC message carried in the SRB1, or the RRC message carried in the SRB2.

Step S505: The anchor node sends a downlink RRC message carried in the SRB1 or the SRB2 to the serving node through the first interface.

The serving node sends the downlink RRC message carried in the SRB1 or the SRB2 to the user terminal through the air interface connection. The downlink RRC message includes: the RRC message carried in the SRB1 or the RRC message carried in the SRB2.

In Embodiment 4 of the present invention, there is no definite order between step S504 and step S505, that is, step S504 may be performed before step S505, or either step S504 or step S505 may be performed.

Step S506: The anchor node sends a first TAC that needs to be supported by the serving node to the serving node.

Optionally, the anchor node receives a second TAC supported by the serving node and indicated by the serving node.

Step S507: The anchor node receives, through an interface established between the anchor node and the MME, a paging message sent by the MME.

The paging message is received by the anchor node from the MME through the S1-MME interface.

Step S508: When the first TAC or the second TAC is included in the paging message, the anchor node sends the paging message to the serving node through the first interface.

Step S509: Receive a code of a serving cell of the serving node that is sent by the serving node.

The code of the serving cell is used by the anchor node to use the serving cell as a serving cell, and is sent to a neighboring anchor node or a neighboring base station.

Step S510: The anchor node receives a Non-UE Associated message sent by the MME, and the anchor node sends the Non-UE Associated message to the serving node through the control plane interface between the serving node and the anchor node.

According to the interface establishing method provided in this embodiment of the present invention, an anchor node receives a first instruction message sent by a serving node; and the anchor node sends response information to the anchor node in response to the first instruction message. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover. When the anchor node receives a paging message sent by an MME, and a first TAC or a second TAC is included in the paging message, the serving node directly receives the paging message sent by the anchor node, thereby reducing a quantity of paging messages and further reducing the signaling load of the core network.

Embodiment 5

Figure 6A:
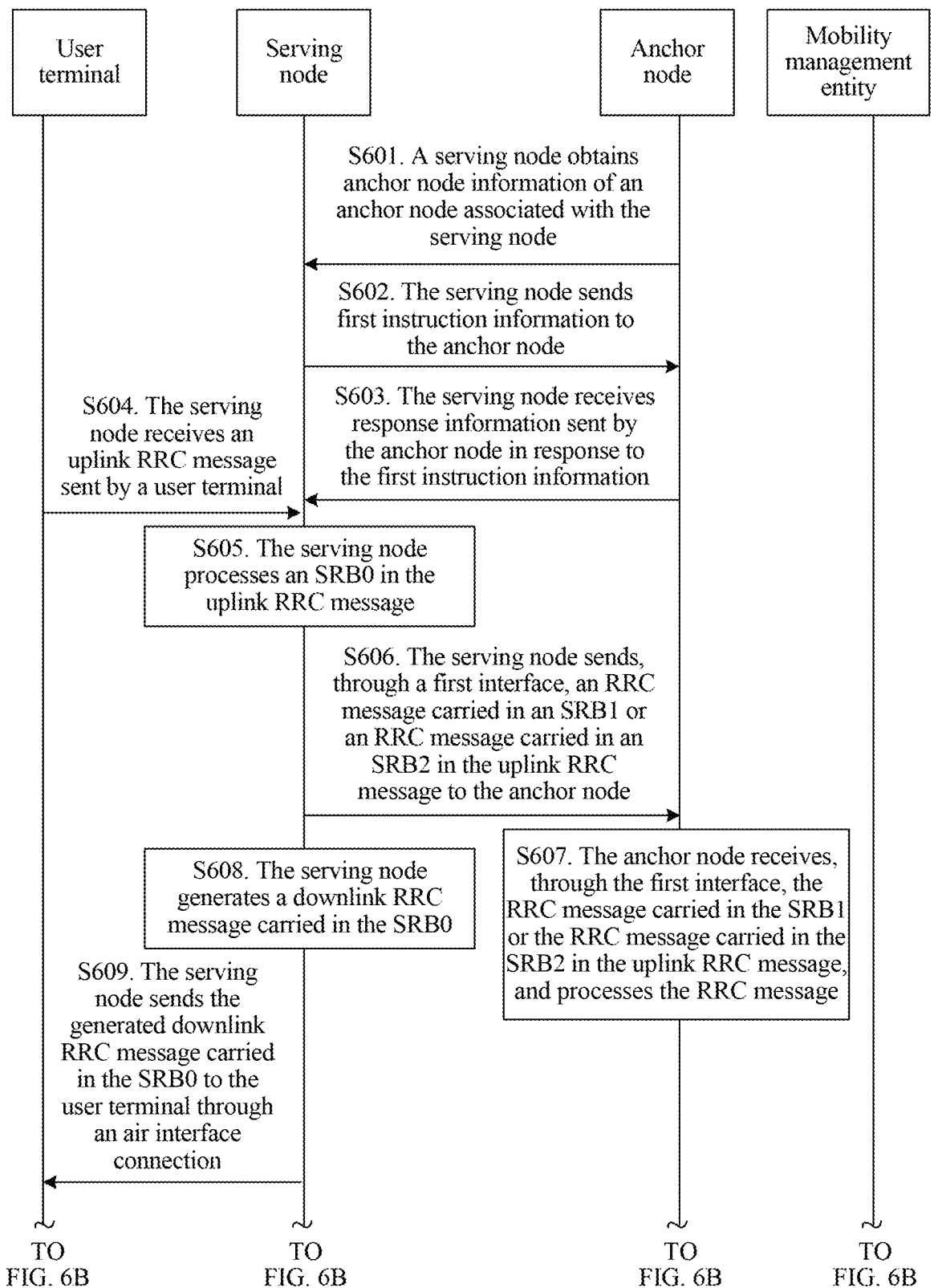
FIG. 6A and FIG. 6B are a signaling diagram of an interface establishing method according to Embodiment 5 of the present invention.
Figure 6B:
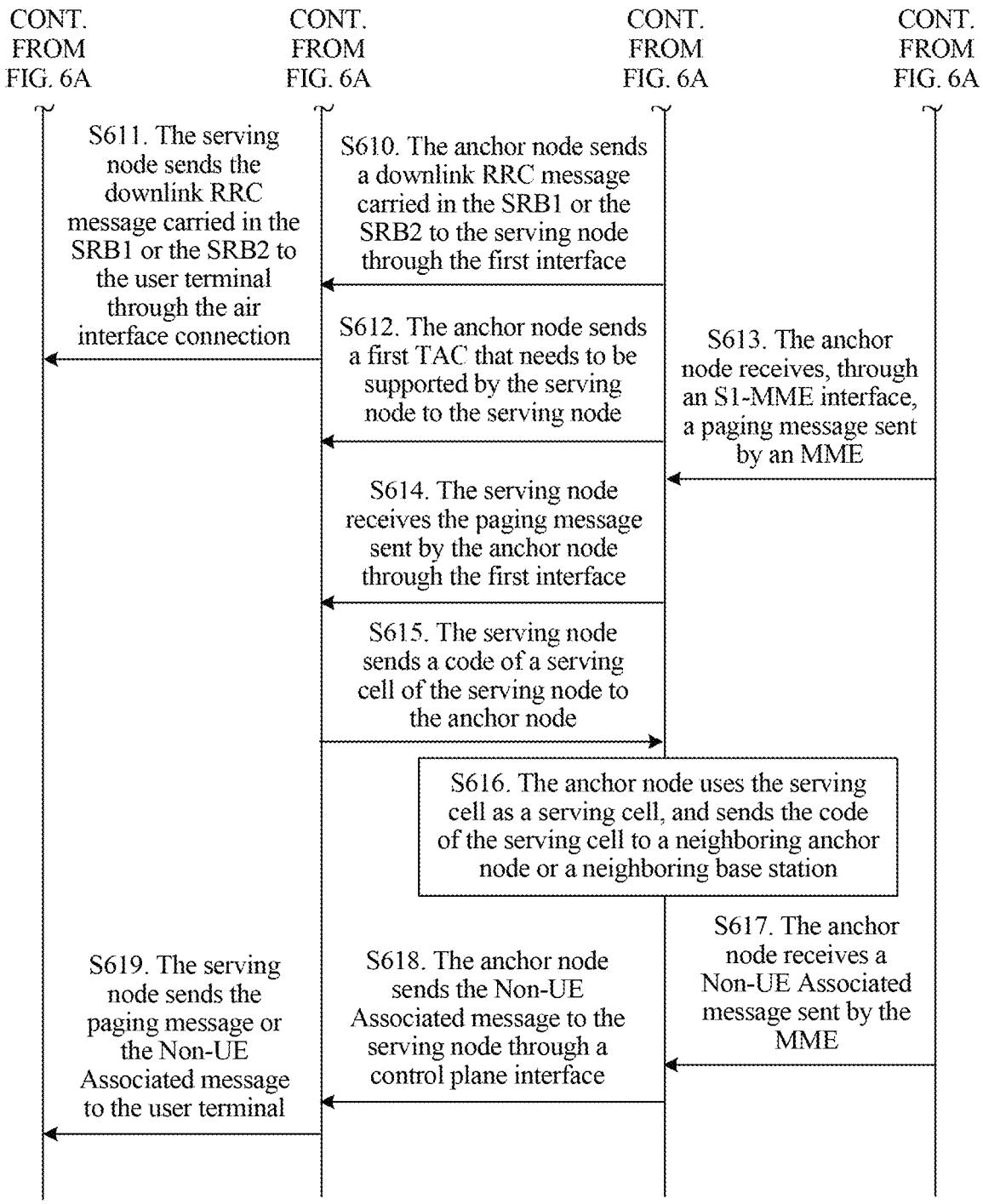

FIG. 6A and FIG. 6B are a signaling diagram of an interface establishing method according to Embodiment 5 of the present invention. As shown in FIG. 6A and FIG. 6B, the following elaborates on a signaling interworking process of an interface establishing method provided in Embodiment 5 of the present invention. The method includes the following steps.

Step S601: A serving node obtains anchor node information of an anchor node associated with the serving node.

The serving node configures, by means of an OAM, the anchor node information of the anchor node associated with the serving node; or the serving node obtains the anchor node information by means of a downlink signal of a base station, where the downlink signal includes a synchronization signal and system information; or when the anchor node information is configured on the serving node, the serving node obtains the configured anchor node information of the anchor node associated with the serving node.

Step S602: The serving node sends first instruction information to the anchor node.

The first instruction information is used to instruct to establish a first interface. The first interface includes at least a control plane interface between the serving node and the anchor node, the control plane interface is at least used to: transmit an RRC message of a user terminal, establish an S1-MME interface connection between the anchor node and an MME, and establish an air interface connection between the serving node and the user terminal, the RRC message corresponding to an SRB1 or an SRB2 in the RRC message of the user terminal is served by the anchor node, and the RRC message corresponding to an SRB0 of the user terminal is served by the serving node.

Step S603: The serving node receives response information sent by the anchor node in response to the first instruction information.

Step S604: The serving node receives an uplink RRC message sent by a user terminal.

The uplink RRC message includes: the RRC message carried in the SRB0, the RRC message carried in the SRB1, or the RRC message carried in the SRB2.

Step S605: The serving node processes an SRB0 in the uplink RRC message.

Step S606: The serving node sends, through the first interface, an RRC message carried in an SRB1 or an RRC message carried in an SRB2 in the uplink RRC message to the anchor node for processing.

Step S607: The anchor node receives, through the first interface, the RRC message carried in the SRB1 or the RRC message carried in the SRB2 in the uplink RRC message, and processes the RRC message.

Step S608: The serving node generates a downlink RRC message carried in the SRB0.

Step S609: The serving node sends the generated downlink RRC message carried in the SRB0 to the user terminal through the air interface connection.

Step S610: The anchor node sends a downlink RRC message carried in the SRB1 or the SRB2 to the serving node through the first interface.

Step S611: The serving node receives, through the first interface, the downlink RRC message carried in the SRB1 or the SRB2 and sent by the anchor node, and the serving node sends the downlink RRC message carried in the SRB1 or the SRB2 to the user terminal through the air interface connection.

Step S612: The anchor node sends a first tracking area code TAC that needs to be supported by the serving node to the serving node.

Optionally, the serving node indicates a second TAC that can be supported by the serving node to the anchor node.

Step S613: The anchor node receives, through the S1-MME interface, a paging message sent by an MME.

Step S614: The serving node receives the paging message sent by the anchor node through the first interface.

The paging message is received by the anchor node from the MME through the S1-MME interface, and the first TAC or the second TAC is included in the paging message sent by the MME.

Step S615: The serving node sends a code of a serving cell of the serving node to the anchor node.

Step S616: The anchor node receives the code of the serving cell of the serving node that is sent by the serving node, and the anchor node uses the serving cell as a serving cell, and sends the code of the serving cell to a neighboring anchor node or a neighboring base station.

Step S617: The anchor node receives a Non-UE Associated message sent by the MME.

Step S618: The anchor node sends the Non-UE Associated message to the serving node through the control plane interface.

Step S619: The serving node sends the paging message or the Non-UE Associated message to the user terminal.

According to the interface establishing method provided in this embodiment of the present invention, an anchor node receives a first instruction message sent by a serving node; and the anchor node sends response information to the anchor node in response to the first instruction message. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover. When the anchor node receives a paging message sent by an MME, and a first TAC or a second TAC is included in the paging message, the serving node directly receives the paging message sent by the anchor node, thereby reducing a quantity of paging messages and further reducing the signaling load of the core network.

Embodiment 6

Figure 7:
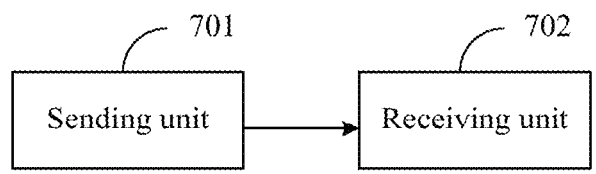
FIG. 7 is a schematic diagram of an interface establishing apparatus according to Embodiment 6 of the present invention.

Embodiment 1 describes an interface establishing method implemented by a serving node. Correspondingly, this embodiment of the present invention further provides an interface establishing apparatus. FIG. 7 is a schematic diagram of an interface establishing apparatus according to this embodiment of the present invention. As shown in FIG. 7, the interface establishing apparatus includes: a sending unit 701 and a receiving unit 702.

The sending unit 701 is configured to send first instruction information to an anchor node, where the first instruction information is used to instruct to establish a first interface between a serving node and the anchor node.

The receiving unit 702 is configured to receive response information sent by the anchor node in response to the first instruction information.

Alternatively, the receiving unit 702 is further configured to receive first instruction information sent by an anchor node, where the first instruction information is used to instruct to establish a first interface; and the sending unit 701 is further configured to send response information to the anchor node in response to the first instruction information.

The first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the apparatus and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

Optionally, the apparatus further includes a processing unit; where the receiving unit 702 is further configured to receive an uplink RRC message sent by the user terminal, where the uplink RRC message includes: the RRC message carried in the SRB0, the RRC message carried in the SRB1, or the RRC message carried in the SRB2; the processing unit is configured to process the SRB0 in the uplink RRC message, or the sending unit is further configured to send, through the first interface, the RRC message carried in the SRB1 or the RRC message carried in the SRB2 in the uplink RRC message to the anchor node for processing; and/or the sending unit 701 is further configured to generate a downlink RRC message carried in the SRB0, and send the downlink RRC message to the user terminal through the air interface connection, or receive, through the first interface, a downlink RRC message carried in the SRB1 or the SRB2 and sent by the anchor node, and send the downlink RRC message carried in the SRB1 or the SRB2 to the user terminal through the air interface connection.

Optionally, the apparatus further includes: an obtaining unit 703, configured to obtain anchor node information of an anchor node associated with the serving node.

Optionally, the obtaining unit 703 is specifically configured to: the obtaining unit 703 is further configured to: obtain, by the serving node, the anchor node information by means of an operation administration maintenance OAM system, or obtain, by the serving node, the anchor node information by means of a downlink signal of the anchor node, where the downlink signal includes a synchronization signal and system information; or a configuration unit 704 is configured to configure the anchor node information on the serving node.

Optionally, the interface for establishing the interface connection between the anchor node and the MME is specifically an S1-MME interface.

Optionally, the anchor node is a base station, or the anchor node is a centralized controller or a control plane server.

Optionally, the receiving unit 702 is further configured to receive a first tracking area code TAC that is sent by the anchor node and that needs to be supported, or the sending unit is further configured to indicate a second TAC supported by the serving node to the anchor node; and the receiving unit 702 is further configured to receive a paging message sent by the anchor node through the first interface, where the paging message is received by the anchor node from the MME through the interface established between the anchor node and the mobility management entity, and the first TAC or the second TAC is included in the paging message sent by the MME.

Optionally, the sending unit 701 is further configured to send a code of a serving cell of the serving node to the anchor node, where the code of the serving cell is used by the anchor node to use the serving cell as a serving cell of the anchor node, and is sent to a neighboring anchor node or a neighboring base station of the anchor node.

Optionally, the receiving unit 702 is further configured to receive, through the control plane interface between the serving node and the anchor node, a non-UE associated Non-UE Associated message sent by the anchor node, where the Non-UE Associated message is received by the anchor node from the MME.

Optionally, the apparatus is located in the serving node.

According to the interface establishing apparatus provided in this embodiment of the present invention, a serving node sends first instruction information to an anchor node; and the serving node receives response information sent by the anchor node in response to the first instruction information. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

Embodiment 7

Figure 8:
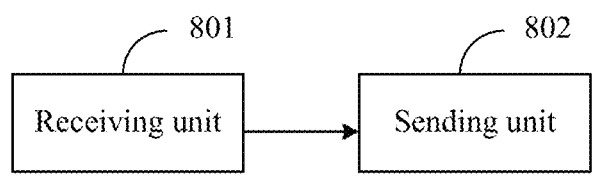
FIG. 8 is a schematic diagram of an interface establishing apparatus according to Embodiment 7 of the present invention.

Embodiment 3 describes an interface establishing method implemented by an anchor node. Correspondingly, this embodiment of the present invention further provides an interface establishing apparatus. FIG. 8 is a schematic diagram of an interface establishing apparatus according to this embodiment of the present invention. As shown in FIG. 8, the interface establishing apparatus includes: a receiving unit 801 and a sending unit 802.

The receiving unit 801 is configured to receive a first instruction message sent by a serving node, where the first instruction information is used to instruct to establish a first interface between the serving node and an anchor node.

The sending unit 802 is configured to send response information to the apparatus in response to the first instruction message.

Alternatively, the sending unit 802 is further configured to send first instruction information to the serving node, where the first instruction information is used to instruct to establish a first interface.

The receiving unit 801 is further configured to receive response information sent by the serving node in response to the first instruction information.

The first interface includes at least a control plane interface between the serving node and the anchor node, the control plane interface is at least used to: transmit an RRC message of a user terminal, establish an interface connection between the apparatus and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

Optionally, the receiving unit 801 is further configured to receive, through the first interface, the RRC message carried in the SRB1 or the RRC message carried in the SRB2 in an uplink RRC message sent by the serving node, and process the RRC message, where the uplink RRC message is received by the serving node from the user terminal, and the uplink RRC message includes: the RRC message carried in the SRB0, the RRC message carried in the SRB1, or the RRC message carried in the SRB2; and/or the sending unit 802 is further configured to send a downlink RRC message carried in the SRB1 or the SRB2 to the serving node through the first interface, so that the serving node sends the downlink RRC message carried in the SRB1 or the SRB2 to the user terminal through the air interface connection, where the downlink RRC message includes: the RRC message carried in the SRB1 or the RRC message carried in the SRB2.

Optionally, the apparatus further includes: an obtaining unit 803, configured to obtain serving node information of a serving node associated with the anchor node.

Optionally, the interface for establishing the interface connection between the anchor node and the MME is specifically an S1-MME interface.

Optionally, the obtaining unit 803 is specifically configured to: obtain the serving node information by means of an OAM; or when the serving node information is configured on the apparatus, obtain the configured serving node information of the serving node associated with the anchor node.

Optionally, the sending unit 802 is further configured to send a first TAC that needs to be supported by the serving node to the serving node, or the receiving unit is further configured to receive a second TAC supported by the serving node and indicated by the serving node; the receiving unit 801 is further configured to receive, through the interface established between the apparatus and the MME, a paging message sent by the MME; and the sending unit 802 is further configured to: when the first TAC or the second TAC is included in the paging message, send the paging message to the serving node through the first interface.

Optionally, the apparatus is a base station, or is a centralized controller or a control plane server.

Optionally, the receiving unit 801 is further configured to receive a code of a serving cell of the serving node that is sent by the serving node, where the code of the serving cell is used by the anchor node to use the serving cell as a serving cell, and is sent to a neighboring anchor node or a neighboring base station.

Optionally, the receiving unit 801 is further configured to receive a Non-UE Associated message sent by the MME, and send the Non-UE Associated message to the serving node through the control plane interface between the serving node and the anchor node.

Optionally, the apparatus is located in the anchor node.

According to the interface establishing apparatus provided in this embodiment of the present invention, an anchor node receives a first instruction message sent by a serving node; and the anchor node sends response information to the anchor node in response to the first instruction message. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

Embodiment 8

Figure 9:
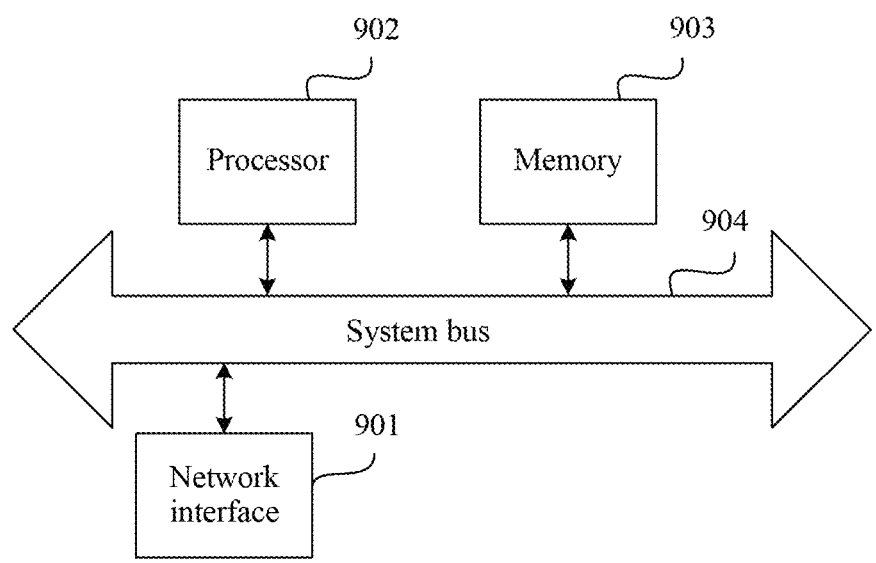
FIG. 9 is a schematic diagram of an interface establishing apparatus according to Embodiment 8 of the present invention.

Embodiment 1 describes an interface establishing method implemented by a serving node. Correspondingly, this embodiment of the present invention further provides an interface establishing apparatus to implement the interface establishing method in Embodiment 1. FIG. 9 is a schematic diagram of an interface establishing apparatus according to this embodiment of the present invention. As shown in FIG. 9, the interface establishing apparatus includes: a network interface 901, a processor 902, and a memory 903. A system bus 904 is configured to connect the network interface 901, the processor 902, and the memory 903.

The network interface 901 is configured to communicate with a terminal of the Internet of Things, an access gateway of the Internet of Things, a bearer network, a serving gateway of the Internet of Things, and an application server.

The memory 903 may be a permanent memory, such as a hard disk drive and a flash memory. A software module and a device driver exist in the memory 903. The software module may be any type of function module capable of implementing the foregoing method of the present invention, and the device driver may be a network and interface driver.

When being started up, such software components are loaded into the memory 903 and are then accessed by the processor 902 to execute the following instructions: sending first instruction information to an anchor node, and receiving response information sent by the anchor node in response to the first instruction information, where the first instruction information is used to instruct to establish a first interface between the serving node and the anchor node; or receiving first instruction information sent by an anchor node, and sending response information to the anchor node in response to the first instruction information, where the first instruction information is used to instruct to establish a first interface; where the first interface includes at least a control plane interface between the serving node and the anchor node, the control plane interface is at least used to: transmit a radio resource control RRC message of a user terminal, establish an interface connection between the anchor node and a mobility management entity MME, and establish an air interface connection between the apparatus and the user terminal, the RRC message carried in a signaling radio bearer 1 SRB1 or a signaling radio bearer 2 SRB2 in the RRC message of the user terminal is served by the anchor node, and the RRC message carried in a signaling radio bearer 0 SRB0 of the user terminal is served by the serving node.

According to the interface establishing apparatus provided in this embodiment of the present invention, a serving node sends first instruction information to an anchor node; and the serving node receives response information sent by the anchor node in response to the first instruction information. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

Embodiment 9

Figure 10:
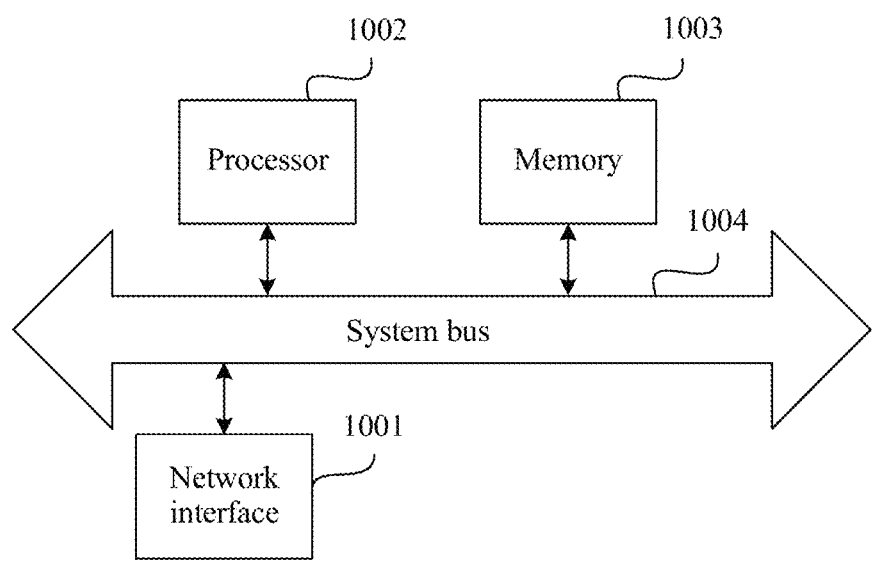
FIG. 10 is a schematic diagram of an interface establishing apparatus according to Embodiment 9 of the present invention.

Embodiment 3 describes an interface establishing method implemented by an anchor node. Correspondingly, this embodiment of the present invention further provides an interface establishing apparatus to implement the interface establishing method in Embodiment 3. FIG. 10 is a schematic diagram of an interface establishing apparatus according to this embodiment of the present invention. As shown in FIG. 10, the interface establishing apparatus includes: a network interface 1001, a processor 1002, and a memory 1003. A system bus 1004 is configured to connect the network interface 1001, the processor 1002, and the memory 1003.

The network interface 1001 is configured to communicate with a terminal of the Internet of Things, an access gateway of the Internet of Things, a bearer network, a serving gateway of the Internet of Things, and an application server.

The memory 1003 may be a permanent memory, such as a hard disk drive and a flash memory. A software module and a device driver exist in the memory 1003. The software module may be any type of function module capable of implementing the foregoing method of the present invention, and the device driver may be a network and interface driver.

When being started up, such software components are loaded into the memory 1003 and are then accessed by the processor 1002 to execute the following instructions: receiving a first instruction message sent by a serving node, and sending response information to the apparatus in response to the first instruction message, where the first instruction information is used to instruct to establish a first interface between the serving node and the anchor node; or sending first instruction information to the serving node, and receiving response information sent by the serving node in response to the first instruction information, where the first instruction information is used to instruct to establish a first interface; where the first interface includes at least a control plane interface between the serving node and the anchor node, the control plane interface is at least used to: transmit an RRC message of a user terminal, establish an interface connection between the apparatus and an MME, and establish an air interface connection between the serving node and the user terminal, the RRC message carried in an SRB1 or an SRB2 in the RRC message of the user terminal is served by the anchor node, and the RRC message carried in an SRB0 of the user terminal is served by the serving node.

According to the interface establishing apparatus provided in this embodiment of the present invention, an anchor node receives a first instruction message sent by a serving node; and the anchor node sends response information to the anchor node in response to the first instruction message. A first interface between the serving node and the anchor node is established according to the first instruction information, so that a radio connection is established between the serving node and the anchor node through the established first interface. The serving node serves an RRC message carried in an SRB0 of a user terminal, and the anchor node serves an RRC message carried in an SRB1 or an SRB2 of the user terminal. In this way, a radio connection between the terminal and the serving node can terminate at the anchor node, and when the terminal changes the serving node of a same anchor node, an interface of the terminal does not need to be changed, thereby reducing signaling load of a core network caused by handover.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objectives, technical solutions, and benefits of the embodiments of the present invention are further described in detail. It should be understood that the foregoing descriptions are merely specific implementation manners of the embodiments of the present invention, but are not intended to limit the protection scope of the embodiments of present invention. Any modification, equivalent replacement, or improvement made without departing from the spirit and principle of the embodiments of the present invention shall fall within the protection scope of the embodiments of the present invention.

What is claimed is:

1. A method, comprising:
sending, by a serving node, instruction information to an anchor node, wherein the instruction information indicates to establish a first interface between the serving node and the anchor node; and
in response to receiving the instruction information, sending, by the anchor node, response information to the serving node; and
wherein the first interface comprises a control plane interface between the serving node and the anchor node, and the control plane interface is configured to transmit a radio resource control message of a terminal, and wherein the radio resource control message carried in a signaling radio bearer 1 (SRB1) of the terminal is served by the anchor node, and the radio resource control message carried in a signaling radio bearer 0 (SRB0) of the terminal is served by the serving node.

2. The method according to claim 1, further comprising:
receiving, by the serving node, an uplink radio resource control message from the terminal, wherein the uplink radio resource control message comprises the radio resource control message carried in the SRB1; and
sending, by the serving node through the first interface, the radio resource control message carried in the SRB1 to the anchor node for processing.

3. The method according to claim 1, further comprising:
receiving, by the serving node through the first interface, a downlink radio resource control message from the anchor node, wherein the downlink radio resource control message comprises the radio resource control message carried in the SRB1; and
sending, by the serving node, the radio resource control message carried in the SRB1 to the terminal through an air interface connection.

4. The method according to claim 1, wherein before sending the instruction information to the anchor node, the method further comprises:
obtaining, by the serving node, anchor node information of an anchor node associated with the serving node.

5. The method according to claim 1, further comprising:
indicating, by the serving node to the anchor node, a tracking area code (TAC) supported by the serving node;
receiving, by the anchor node, a first paging message from a mobility management entity through a second interface established between the anchor node and the mobility management entity, wherein the first paging message carries the TAC; and
in response to receiving the first paging message, sending, by the anchor node, a second paging message to the serving node through the first interface.

6. The method according to claim 1, further comprising:
receiving, by the anchor node, a Non-UE Associated message from a mobility management entity; and
sending, by the anchor node through the control plane interface, the Non-UE Associated message to the serving node.

7. The method according to claim 1, further comprising:
sending, by the serving node to the anchor node, a code of a serving cell, wherein the code of the serving cell is used by the anchor node to use the serving cell as a serving cell of the anchor node; and
sending, by the anchor node, the code of the serving cell to a neighboring base station of the anchor node.

8. The method according to claim 1, wherein the anchor node is a centralized controller.

9. A system, comprising:
a serving node; and
an anchor node;
wherein the serving node is configured to send instruction information to the anchor node, the instruction information indicates to establish a first interface between the serving node and the anchor node, the first interface comprises a control plane interface between the serving node and the anchor node, and the control plane interface is configured to transmit a radio resource control message of a terminal; and
wherein the anchor node is configured to send response information to the serving node in response to the instruction information, and wherein the radio resource control message carried in a signaling radio bearer 1 (SRB1) of the terminal is served by the anchor node, and the radio resource control message carried in a signaling radio bearer 0 (SRB0) of the terminal is served by the serving node.

10. The system according to claim 9, wherein the serving node is further configured to:
receive an uplink radio resource control message from the terminal, wherein the uplink radio resource control message comprises the radio resource control message carried in the SRB1; and
send, through the first interface, the radio resource control message carried in the SRB1 to the anchor node for processing.

11. The system according to claim 9, wherein the serving node is further configured to:
receive, through the first interface, a downlink radio resource control message from the anchor node, wherein the downlink radio resource control message comprises the radio resource control message carried in the SRB1; and
send the radio resource control message carried in the SRB1 to the terminal through an air interface connection.

12. The system according to claim 9, wherein the serving node is further configured to:
obtain anchor node information of an anchor node associated with the serving node.

13. The system according to claim 9, wherein:
the serving node is further configured to indicate, to the anchor node, a tracking area code (TAC) supported by the serving node;
the anchor node is further configured to receive a first paging message from a mobility management entity through a second interface established between the anchor node and the mobility management entity, wherein the first paging message carries the TAC; and
the anchor node is further configured to send, through the first interface, a second paging message to the serving node in response to receiving the first paging message.

14. The system according to claim 9, wherein the anchor node is further configured to:
receive a Non-UE Associated message from a mobility management entity; and
send, through the control plane interface, the Non-UE Associated message to the serving node.

15. The system according to claim 9, wherein:
the serving node is further configured to send a code of a serving cell to the anchor node, wherein the code of the serving cell is used by the anchor node to use the serving cell as a serving cell of the anchor node; and
the anchor node is further configured send the code of the serving cell to a neighboring base station of the anchor node.

16. The system according to claim 9, wherein the anchor node is a centralized controller.

17. A non-transitory computer-readable storage medium comprising processor-executable instructions, which when executed by a processor of an apparatus, cause the apparatus to implement operations including:
sending instruction information to an anchor node, wherein the instruction information indicates to establish a first interface between a serving node and the anchor node; and
receiving response information from the anchor node; and
wherein the first interface comprises a control plane interface between the serving node and the anchor node, and the control plane interface is configured to transmit a radio resource control message of a terminal, and wherein the radio resource control message carried in a signaling radio bearer 1 (SRB1) of the terminal is served by the anchor node, and the radio resource control message carried in a signaling radio bearer 0 (SRB0) of the terminal is served by the serving node.

18. The non-transitory computer-readable storage medium of claim 17, wherein the processor-executable instructions, when executed by the processor of the apparatus, further cause the apparatus to implement operations including:
receiving an uplink radio resource control message from the terminal, wherein the uplink radio resource control message comprises the radio resource control message carried in the SRB1; and
sending, through the first interface, the radio resource control message carried in the SRB1 to the anchor node for processing.

19. The non-transitory computer-readable storage medium of claim 17, wherein the processor-executable instructions, when executed by the processor of the apparatus, further cause the apparatus to implement operations including:
receiving, through the first interface, a downlink radio resource control message from the anchor node, wherein the downlink radio resource control message comprises the radio resource control message carried in the SRB1; and
sending the radio resource control message carried in the SRB1 to the terminal through an air interface connection.

20. The non-transitory computer-readable storage medium of claim 17, wherein the processor-executable instructions, when executed by the processor of the apparatus, further cause the apparatus to implement operations including:
indicating to the anchor node, a tracking area code (TAC) supported by the serving node; and
receiving a paging message from the anchor node through the first interface, wherein the paging message is received by the anchor node from a mobility management entity through an interface established between the anchor node and the mobility management entity, and a TAC is comprised in the paging message received from the mobility management entity.

* * * * *